Figure 1:
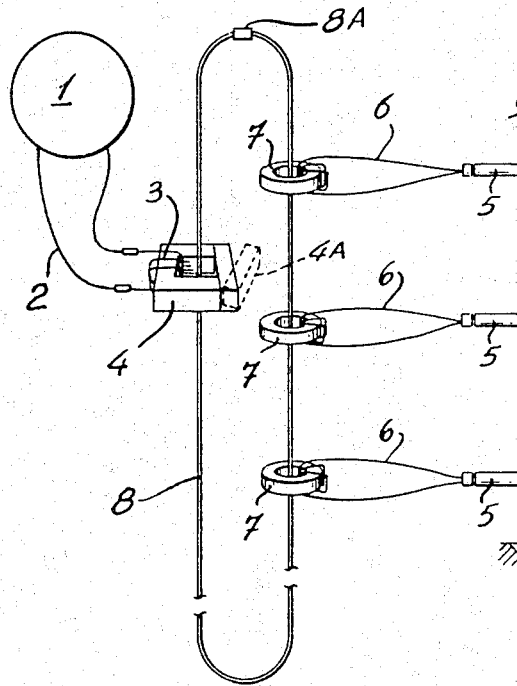

United States Patent [19]

Jorgenson

[11] Patent Number: 4,519,314
[45] Date of Patent: May 28, 1985

[54] BOREHOLE CHARGING METHOD INCLUDING TOROIDAL TRANSFORMER CORES

[75] Inventor: Gordon K. Jorgenson, Dollard des Ormeaux, Canada

[73] Assignee: C-I-L Inc., North York, Canada

[21] Appl. No.: 272,487

[22] Filed: Jun. 11, 1981

[30] Foreign Application Priority Data

Jul. 29, 1980 [GB] United Kingdom ............... 8024698

[51] Int. Cl.³ .............................................. F42B 3/00
[52] U.S. Cl. ............................ 102/313; 102/312; 102/202.2; 102/202.9; 102/206; 86/20 C
[58] Field of Search .............. 102/312, 313, 202.9, 102/202.2, 217, 206; 86/20 C

[56] References Cited

U.S. PATENT DOCUMENTS

| | | | |
|---|---|---|---|
| 3,018,733 | 1/1962 | Johnson | 102/202.2 X |
| 3,091,177 | 5/1963 | Grebe | 102/313 |
| 3,133,231 | 5/1964 | Fail et al. | 102/217 X |
| 3,148,619 | 9/1964 | Holinbeck | 102/202.2 |
| 3,987,729 | 10/1976 | Andrews et al. | 102/312 X |
| 4,133,247 | 1/1979 | Calder, Jr. et al. | 86/20 C |
| 4,145,968 | 3/1979 | Klein | 102/202.2 |
| 4,297,947 | 11/1981 | Jones et al. | 102/206 |

FOREIGN PATENT DOCUMENTS 2040612 1/1979 United Kingdom ............. 102/202.2

*Primary Examiner*—Peter A. Nelson
*Attorney, Agent, or Firm*—Donald G. Ballantyne

[57] ABSTRACT

A method of charging a borehole with a column of explosives is described wherein the explosive charge is detonable in time-delay sequence by means of electrically initiated detonators. The method requires providing a loop of an insulated electrical conductor throughout the length of the borehole and, as the borehole is charged with explosives, sliding electrically actuable time-delay detonators along the wire so as to be positioned at intervals throughout the borehole. The detonators are electrically coupled to the looped wire by means of slidable toroidal transformer cores. The wire loop, in turn, is electromagnetically energized by means of a second transformer core and an energy source. The method provides for safe and efficient borehole charging and avoids the hazards associated with usual electric detonator systems.

4 Claims, 3 Drawing Figures

U.S. Patent      May 28, 1985      4,519,314

BOREHOLE CHARGING METHOD INCLUDING TOROIDAL TRANSFORMER CORES

This invention relates to a method of blasting with explosives in which a column of explosives in a borehole, where the explosive is typically separated into sections by interspersed inert material, is initiated at more than one location along the column in time-delay sequence and in which the initiators are set off electrically. This method is generally known as multiple primer or decked charge blasting.

The utility of time-delay multiple primer blasting for the purpose of optimizing explosive energy and minimizing detrimental effects to the surrounding environment is now well known and well documented. Briefly described in connection with decked charges, time delay blasting involves the charging of one or more boreholes with explosives and during the charging, placing initiating primers in the borehole at intervals along the explosive column. The primers are then detonated in sequence, normally from the bottom to top of the borehole, in order to achieve the optimum blasting results noted heretofore.

Generally, the preferred method of charging a borehole for time-delay blasting purposes makes use of non-electric initiating components. In such a non-electric system, a length of detonating cord is placed as a down line throughout the length of a borehole and, as the borehole is charged with bulk or packaged explosives, primer charges each containing a delay initiating element, for example, a non-electric delay cap, are slid down and in close proximity with the down line so that the fully charged borehole may contain several primers decked at intervals along its length. The delay initiating element in each of the primers is selected so as to provide the most efficient blasting results. Upon initiation of the detonating cord down line, the associated primers are initiated in a planned time-delay sequence. Typical non-electric time delay blasting methods are described, for example, in U.S. Pat. Nos. 4,060,033 and 4,133,247.

While electric blasting caps are known to provide the most accurate means of achieving accurate time delays and the optimum in time delay blasting effect, the use of electric caps has generally been avoided where multiple primer decked charge blasting is employed. This is because separate electrical conductive lead wires are required to initiate each separate electric delay cap and this results in complications which are time consuming and costly in loading the borehole because of a multitude of wires therein. In addition, because electrical initiation systems are unacceptable in areas where stray electric currents may occur or may be inadvertently detonated during electrical storms, many blasters avoid their use for safety reasons. Indeed, in some jurisdictions, the use of the usual electric initiation system is prohibited.

In accordance with the present invention there is provided a method of charging a borehole with a column of explosives for electrically induced initiation at more than one location along the column, which method comprises the steps of;

(a) providing a length of an insulated electrical conductor in the form of a looped wire extending into said borehole, a portion of said looped wire conductor extending beyond said borehole;

(b) providing a first electrically actuable detonator assembly in slidable surrounding relationship with the said insulated conductor wire by means of a coupled toroidal transformer core;

(c) providing a second electrically actuable detonator assembly in slidable surrounding relationship with the said insulated conductor wire by means of a coupled toroidal transformer core;

(d) loading a first portion of explosive material into said borehole;

(e) sliding said first detonator along said insulated conductor wire to a location in said borehole where the said detonator is in initiating contact with the said first portion of explosive material;

(f) loading a second portion of explosive material into said borehole;

(g) sliding said second detonator along said insulated conductor wire to a location in said borehole where the said detonator is in initiating contact with the said second portion of explosive material; and (h) coupling the portion of said looped conductor wire beyond the borehole with a transformer core in such a way that electrical energy passing through said transformer core electromagnetically couples an electric signal to said looped wire conductor, the said electric signal in said looped wire conductor thereby inducing a magnetic flux within each toroid of each detonator assembly in sliding contact therewith, the said magnetic flux providing an electric signal sufficient to detonate each of said detonators.

The principal object of the invention is to provide a method of charging a borehole with a column of explosives which is separated into sections by interspersed inert material, and detonating the column in time delay sequence which method makes use of a fully electric initiation system devoid of any of the hazards or deficiencies of previously employed electric initiators.

The ignition system of the present invention comprising electromagnetically coupled delay initiators and the means whereby the timing and activation of the initiators are provided, are the subject of co-pending Canadian patent application Nos. 320,662; 320,663; 327,471 and 343,662. Briefly described, the delay electric initiator or cap employed comprises a heat-actuated ignition element or fusehead connected through insulated lead wires and a doughnut-shaped toroidal like core element to the secondary winding of a transformer which secondary winding is magnetically linked to a primary winding through a magnetic circuit. Electrical ignition energy is passed to the fuse head in response to an input energy having predetermined magnitude and frequency characteristics. In this way spurious sources of electrical energy may be eliminated as potential ignition energy signals, thereby avoiding nearly all hazard of premature detonation. The detonable component or cap generally comprises a typical tubular metal shell closed at one end and containing in sequence from the closed end a detonating explosive charge and a delay element, the delay element being ignited by the ignition element herebefore referred to. An insulated continuous ignition lead wire from the ignition charge and its associated hot wire is looped around a doughnut-shaped toroidal core which core in turn is electromagnetically coupled to a transformer by means of a single loop of insulated wire passed through the transformer core and the toroidal core. A firing cable coupled to a source of electric energy is also looped around the transformer core completing the formation of the transformer. Thus a system is provided whereby a delay electric detonator (and any associated primer charge) may be electrically coupled in sliding fashion by a toroidal core loop to a single loop of insulated wire in a borehole, the loop of wire in the borehole in turn being electromagnetically coupled to a transformer.

Figure 3:
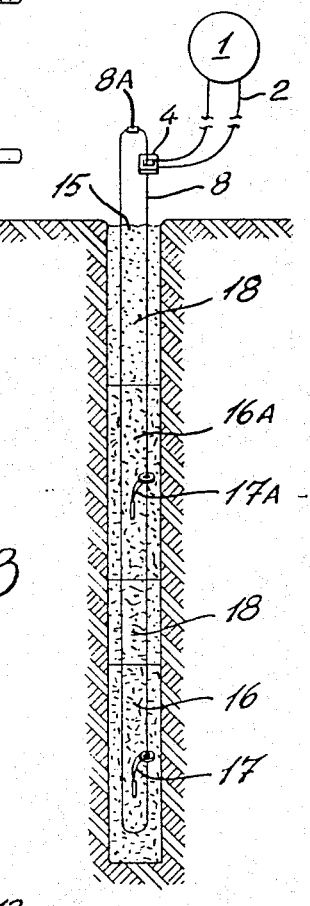
Figure 2:
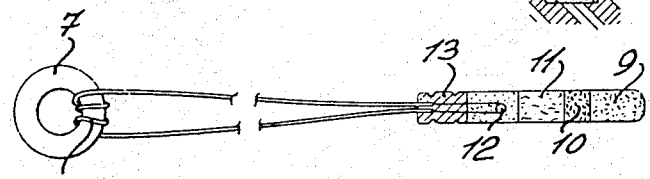

The present invention may be better understood by reference to the accompanying drawing wherein FIG. 1 is a diagramatic representation of the ignition system of the invention showing several initiators in sliding coupled relationship with an energy loop, and FIG. 2 is a view partly in cross-section of the initiator assembly unit of FIG. 1 and its associated toroidal core element FIG. 3 shows in cross-setion a view of a charged borehole.

Referring to the figures of the drawing in detail, FIG. 1 shows a source of electrical energy 1 electrically coupled to a firing cable 2 which in turn is electrically coupled to the primary winding 3 about a transformer ring core 4. Ring core 4 is shown with a moveable portion 4A to permit the ring core to be opened temporarily. An ignition element or electric blasting cap 5 is connected to continuous ignition lead wire 6 which is electromagnetically coupled to a toroidal transformer core 7. Whereas, for convenience, core 7 is herein referred to as a toroid which expression implies a cylindrical shape, it is to be understood that other shapes such as, for example, rectangular, multi-angular, etc., may be employed. Core(s) 7 are in turn electromagnetically coupled to transformer ring core 4 by a single loop of insulated wire 8 passing through each toroid 7 and passing through the transformer ring core 4. Wire loop 8 has a quick connect/disconnect element 8A thereon.

FIG. 2 shows an electric blasting cap 5 containing in sequence from its closed base end a detonating charge 9, a primer charge 10, a delay element 11, a fuse head igniter 12 and a sealing plug 13. A looped continuous lead wire 6 is connected through a hot wire electric resistive element (not shown) in fuse head 12 and is electromagnetically coupled to toroidal transformer core 7 by several loop windings, 14.

In the arrangement represented in FIG. 1 the following method of firing actuates blasting cap 5: Energy source 1 generates an electrical firing energy which is electromagnetically coupled to transformer ring-core 4 via firing cable 2 and primary winding 3. The changing magnet flux induced within transformer ring-core 4 electromagnetically couples an electrical signal to loop 8 of insulated wire passing through toroidal transformer cores 7. By virtue of the electromagnetic coupling between loop 8 and toroidal transformer cores 7, a magnetic flux is induced within each of the toroids. The electromagnetic coupling between toroidal transformer cores 7 and igniter leading wire 6 induce an electrical signal within the igniter leading wire 6 which in turn actuates resistive electric ignition elements within fuse head 12.

In essence, the firing method includes the steps of:
electrically connecting the terminals of the resistive electric ignition element of a delay electric blasting cap to the two ends of a continuous length of insulated electrically conductive wire;
electromagnetically coupling the continuous length of wire to an ignition assembly magnetically permeable core;
electromagnetically coupling the ignition assembly magnetically permeable core to a transformer core; and
electromagnetically coupling the transformer core to a source of electrical firing energy.

As a specific but nonlimiting example, one particular arrangement as shown in FIG. 1 may be constructed as follows: Firing unit 1 includes a signal generator having an output frequency of 10 kHz. driving a 25-watt power amplifier designed to work into a 16-ohm load. The amplifier output is coupled directly to a 100-meter long twin core firing cable 2 in which each core consists of 7 strands of 0.4 mm diameter copper wire and is insulated to a total diameter of 3.1 mm using polyvinyl chloride, the total resistance of the firing cable being 4 ohms. Transformer ring-core 4 is a rectangle of high permeability ferrite material having outside dimensions 6.3 cm×5.7 cm and cross-sectional dimension of 13 mm×13 mm. Primary winding 3 consists of 12 turns of 0.61 mm diameter copper wire coated to an outside diameter of 1.14 mm with polyvinyl chloride. Toroidal transformer cores 7 are high permeability ferrite material each having an outside diameter of 2.5 cm and a cross-sectional area of 15 mm$^2$. Ignition leading wires 6 are constructed from the same wire utilized in primary winding 3 and are looped five times around toroidal transformer cores 7. Loop 8 is a length of 0.61 mm diameter copper insulated with polyvinyl chloride to an outside diameter of 1.14 mm. Delay blasting caps 5 were fired sequentially from a single signal from power unit 1 using this configuration.

With reference to FIG. 3 where is depicted a borehole charged with a column of explosives to be detonated in time-delay sequence at more than one location along the column, a single length of looped insulated wire 8, slightly longer in looped length than the depth of the borehole, is inserted into the borehole 15. Wire 8 is disconnected at element 8A and, as the explosives 16 and 16A is charged into the borehole, delay cap assemblies and toroid units 17 and 17A as shown in FIG. 2 and having selected time-delay intervals, are passed along wire 8 threaded through toroids 7 and are allowed to slide along wire 8 into the borehole. Primer charges may be attached to the blasting caps. Inert or non-explosives filler material (stemming) 18 may be placed in the borehole between explosive charges 16 and 16A and at the top of the borehole. After the borehole is charged, wire 8 is passed through transformer ring core 4 and thereafter connected at element 8A. The system is then ready for firing upon the delivery of electrical energy from source 1 through firing cable 2.

The borehole charging and initiation method or system of the invention provides significant advantage over conventional electric blasting cap initiation systems in that no direct physical connection to a source of electrical initiating energy is required. The detonator element itself is an insulated closed path unit which provides resistance against the accidental pick-up of stray currents or other extraneous electrical signals which can lead to premature firing of conventional electric blasting caps. The system of the invention also provides advantages over conventional non-electric initiation systems in that no explosives or incendiary initiating signal (detonating cord or safety fuse) is required to be placed in the borehole. Neither does the explosive primer or booster used in association with non-cap sensitive explosives have to be protected against the passage of a detonating signal from a cord or fuse to the blasting cap. Further, the system of the invention provides for the manufacture of circuits of exact length and so avoids the need for any physical splicing of wiring and hence the risk of physical disconnection, current leakage or corrosion leading to misfired detonators is avoided.

I claim:

1. A method of charging a borehole with a column of explosives for electrically induced initiation at more than one location along the column by means of an electrically actuable detonator assembly adapted for slidable electromagnetic coupling to an energy source by means of a toroidal transformer core, which method comprises the steps of (a) providing a length of an insulated electrical conductor in the form of a looped wire extending into and throughout the length of said borehole, a portion of said looped wire conductor extending beyond said borehole;

(b) providing a first electrically actuable detonator assembly in slidable surrounding relationship with the said insulated conductor wire by means of a coupled toroidal transformer core;

(c) providing a second electrically actuable detonator assembly in slidable surrounding relationship with the said insulated conductor wire by means of a coupled toroidal transformer core;

(d) loading a first portion of explosive material into said borehole;

(e) sliding said first detonator assembly toroid along said insulated conductor wire to a location in said borehole where the said detonator assembly is in initiating contact with the said first portion of explosive material;

(f) loading a second portion of explosive material into said borehole;

(g) sliding said second detonator assembly toroid along said insulated conductor wire to a location in said borehole where the said detonator assembly is in initiating contact with the said second portion of explosive material; and (h) coupling the portion of said looped conductor wire beyond the borehole with an A.C. energy source to transmit an electric signal to said looped conductor, the said electric signal in said looped wire conductor thereby inducing a magnetic flux within each toroid of each detonator assembly in sliding contact therewith, the said magnetic flux providing an electric signal sufficient to detonate each of said detonators.

2. A method as claimed in claim 1 wherein the looped conductor wire beyond the borehole is coupled to the A.C. energy source through a transformed core whereby the signal from the energy source electromagnetically induces a signal in the looped conductor.

3. A method as claimed in claim 1 wherein the explosive portions in the borehole are separated by stemming material.

4. A method as claimed in claim 1 wherein a booster charge is placed in initiating contact with the said detonators.

* * * * *